Patented Sept. 3, 1935

2,013,092

UNITED STATES PATENT OFFICE 2,013,092

ORGANIC COLORING MATERIAL COMPRISING AN AZO COMPOUND AND A NAPHTHENATE AS A SUBSTRATUM

Archibald Mortimer Erskine, Chatham, N. J., assignor to Krebs Pigment & Color Corporation, Newark, N. J., a corporation of Delaware No Drawing. Application October 16, 1933, Serial No. 693,828

7 Claims. (Cl. 134—58.5)

The present invention comprises novel azo lakes or pigments in which the azo compound is combined with a substratum comprising a naphthenate.

The terms naphthenic acid and naphthenates as used herein refer to cycloparaffinic carboxylic acids as found particularly in various petroleum oils. They are defined by M. Naphtali in his "Chemie, Technologie und Analyse der Naphthensauren" (1927) as all acids and acid mixtures of the formula $C_nH_{2n}-2O_2$ which occur in crude petroleum, or are derived through refining of the same. They differ widely in boiling points, specific gravities, viscosities, etc. depending upon their purity and the oil fractions from which derived.

Naphthenates have already been suggested as dispersing agents for dry colors and inorganic pigments (see for instance French Patent 654,745). According to this patent the naphthenates are merely mechanically admixed with the dry colors which can be of organic or inorganic nature, whereas in my novel lakes and pigments the naphthenates are chemically or physically combined with the azo compound, thereby forming true lakes and pigments. I obtain this chemical or physical combination by a certain treatment in which the azo compound and the naphthenate are heated in aqueous suspensions, during which changes in the physical or chemical nature of the azo compound take place and it combines with the naphthenate. Such change and combination is commonly called the development of the lake or pigment; the material which by this process combines with the azo color is then called the "substratum".

My novel lakes and pigments in which the naphthenate is combined with and acts as a substratum are distinguished from mechanical mixtures by cleaner, brighter shades, greater tinctorial strength and other improved tinctorial properties.

My novel process consists, therefore, in heating, for instance, to the boiling temperature, an aqueous suspension of an insoluble azo coloring compound and an insoluble or colloidally dispersed naphthenate. It is in this process quite immaterial how this suspension is prepared.

I can, for instance, add a soluble alkali metal naphthenate to either the diazo or the coupling compound and combine the latter two to form the azo coloring compound. The insoluble azo salt and the insoluble naphthenate are then formed by the addition of an alkaline earth or heavy metal salt, whereupon I heat the suspension, for instance to the boiling temperature and thereby develop the lake. In this procedure, I may, if desired, first separate the mother liquor from the mixture of co-precipitated salts, then form a new aqueous slurry therefrom and then only proceed with the development. I can also separately prepare the more or less soluble azo coloring compound, add thereto the soluble naphthenate, precipitate the insoluble salts and proceed with the development. I can also separately prepare the insoluble components of the lake, form an aqueous slurry therefrom and heat this, or I can prepare my aqueous suspension in any other manner as will be obvious to those skilled in this art.

The insoluble naphthenates as used for the development of my lakes and pigments are prepared by the action of alkaline earth or heavy metal salts upon the corresponding more or less soluble alkali metal salts. Calcium, barium, aluminum, zinc, lead salts, etc. are preferred for this purpose. Similarly when using salt-forming azo compounds I use their alkaline earth and heavy metal salts.

The development can be carried out in neutral or alkaline solution with similar results, though in many instances an alkaline development is preferred. In many instances I can also add a dispersing agent to the aqueous development suspension. I found that soaps, sulfonated vegetable or animal oils, such as Turkey red oil, sulfonated castor oil, sulfonated cotton seed oil, sulfonated fish oil, etc. are well adapted for this purpose.

My invention is applicable to various azo dyestuffs of the following three types which are capable of being transformed into pigments.

*Mono-azo monosulfonic acids.*—The sulfonic acid group is usually and preferably located in the first, or diazo component. These toners are more or less soluble in the form of their free acids or alkali metal salts and are rendered insoluble by treatment with an alkaline earth or heavy metal salt. Instances of such combinations are the compounds formed by coupling 1. Diazotized 2-naphthylamine 1-sulfonic acid with beta naphthol (Lithol red, Colour Index No. 189).

2. Diazotized para-nitraniline ortho-sulfonic acid with beta naphthol (Lake red P, Colour Index No. 158).

3. Diazotized 2-naphthylamine 1-sulfonic acid with salicylic acid.

4. Diazotized para-toluidine meta-sulfonic acid with the anilide of beta oxynaphthoic acid.

*Mono-azo monocarboxylic acids.*—The carboxylic acid group may be in either component and the component not containing the carboxylic group may or may not contain a sulfonic acid group. These toners are more or less soluble as their free acids or alkali metal salts and are rendered insoluble by treatment with an alkaline earth or heavy metal salt. For example, such toners can be formed by coupling 1. Diazotized para-toluidine metasulfonic acid with beta oxynaphthoic acid (Lithol rubine, Colour Index No. 163).
2. Diazotized para-nitro ortho-toluidine with beta oxynaphthoic acid.
3. Diazotized anthranilic acid with beta naphthol (Lake red D, Colour Index No. 214).
4. Diazotized 2-naphthylamine 1-sulfonic acid with beta oxynaphthoic acid (Lake bordeaux B, Colour Index No. 190).

*Azo pigment dyestuffs.*—This type of toner is a substantially insoluble dyestuff produced in the coupling itself and does not contain salt-forming groups. The following illustrative cases are formed by coupling 1. Diazotized para-nitro-aniline with beta naphthol. (Para red, Colour Index No. 44).
2. Diazotized meta-nitro para-toluidine with aceto-acetanilide (Hansa yellow G).
3. Diazotized para-nitro ortho-toluidine with beta naphthol (Pigment orange R, Colour Index No. 68).
4. Diazotized alpha-naphthylamine with beta naphthol (Autol red RL, Colour Index No. 82).

It is common in the dyestuff and pigment art to use the abbreviated term beta-oxynaphthoic acid for the compound scientifically known as 2.hydroxynaphthalene-3.carboxylic acid and beta-oxynaphthoic acid is used herein with this meaning.

For the purpose of this invention and in accordance with commercial practice, a "toner" is defined as an organic pigment which may or may not contain salt-forming groups and which is not associated with a substratum or extender; and a "lake" is an organic pigment which contains a substratum or extender. In the former type of pigment the true coloring matter is produced directly in an insoluble form and can be used for various purposes as such, without the addition of a substratum; in the latter type the true coloring matter is associated intimately with a substratum, which is commonly an inorganic substance, such as alumina hydrate, blanc fixe, etc. or combinations of the same.

The choice between the two types of pigments depends largely upon the intended use, there being various essential differences in their properties, which relate to texture, dispersion, oil absorption, bulking value, and behavior in vehicles. These differences are best explained by the following illustrations.

The alkaline earth salt of the dyestuff prepared by coupling diazotized para-toluidine meta sulfonic acid with beta oxynaphthoic acid may be used as such (toner form) or may be extended with a substratum consisting of alumina hydrate and blanc fixe (lake form). For use as a rubber pigment it has been found that the lake form has definite advantages over the toner in respect to (a) greater strength for the same dyestuff content, (b) reduction of the tendency to crock and (c) blending with other pigments. Similarly, in the application of pigments to linoleum the lake or extended type of pigment has a definite advantage because of ease of dispersion. In paints and enamels, toners are generally used for their advantages in such properties as gloss; however, in the case of the cheap Para reds (so-called Grinder's reds) a substratum is an aid in the grinding of the paint.

In the field of printing inks, the lake form of pigment may offer an advantage over the toner form under certain conditions where texture is an important problem. On the other hand, toners show advantages from the point of view of allowing the ink-maker greater freedom in the choice of white base (extender) which he grinds into the ink; however, under certain conditions the combination of toner and white pigment ordinarily used in the ink might be replaced by a lake color which would result in simplification in the manufacture of the ink.

The present invention relates to the lakes which contain a substratum, and they can be obtained from the toner type of azo compounds as well as from the azo compounds which only by association with a substratum become a pigment, or lake, in both instances the azo compound is substantially water insoluble before developing or becomes so during development.

The products of the present invention combine to a certain extent the color strength and properties of a toner with the properties usually found in a lake formed with an inorganic substratum.

The amount of naphthenate substratum contained in my novel lakes and pigments is not of particular significance. Small amounts of say about 5% show decided improvements in the tinctorial properties. When using larger amounts of naphthenate, for example, up to 30% of the final lake, the naphthenate produces in some instances lakes of substantially the same tinctorial strength as a pigment containing no substratum.

My novel azo lakes and pigments are characterized chemically by being a combination of an azo-coloring compound and a naphthenate in which the naphthenate acts as a substratum.

The following are typical examples of novel azo pigments and how I prepared them according to my invention.

It will be understood that my invention is not limited to these particular examples or to the specific manipulation steps disclosed therein.

Similar results are also obtained with other azo coloring compounds which are capable of forming lakes and pigments on development in the presence of a substratum and similar results are also obtained by using in the development other alkaline earth and heavy metal salts of the azo compound and of the naphthenic acid.

*Example I.*—A solution of 41.8 parts of the sodium salt of paratoluidine meta sulfonic acid ($CH_3:SO_3:NH_2=1:3:4$) is diazotized with 14.4 parts of nitrite of soda and 52 parts of 20° Bé. muriatic acid.

40 parts of beta oxynaphthoic acid ($OH:COOH=2:3$) are dissolved in a solution of 16.3 parts of caustic soda and 200 parts of water. To this are added 40.3 parts of soda ash in 400 parts of water. The temperature and volume of the beta oxynaphthoic acid solution is adjusted to 40° C. and 1000 parts of solution, and the above described diazo preparation is then run in whereupon the azo coupling proceeds quickly and to good completion. After stirring a short time the dyestuff is filtered.

The soda salt dye paste is then re-slurried to 16,800 parts of water at 40° C. To this are added 9.6 parts of para soap which is the ammonium salt of Turkey red oil, or ammonium ricinoleate in 50 parts of water. In a separate container 32 parts of naphthenic acid are added to a solution of 6.5 parts of caustic soda in 400 parts of water, and the solution boiled until the formation of the soluble naphthenic acid soap is complete. This naphthenic acid soap solution is then added to the dye solution and the temperature adjusted to 40° C. and stirred 15 minutes.

In a separate container 80 parts of calcium chloride are dissolved in 2000 parts of water, and the temperature adjusted to 27° C., and into this is then run in 10 minutes the dye soap solution. There is then added 41 parts of caustic soda in 500 parts of water and the slurry stirred for 15 minutes. The charge is then heated to the boil and digested at this temperature for ½ hour, after which it is washed, filtered and dried in the usual manner.

The yield is approximately 126 parts of pigment compared with 92 parts in a charge carried out in exactly the same way but without the naphthenic acid, the difference represents the naphthenate substratum. The calcium naphthenate lake is equal in covering power (determined by tinting in white) to the product obtained without the use of naphthenic acid, and is equal in this respect to the ordinary commercial calcium lithol rubine toner. It is much brighter in shade, cleaner in tone and when ground into litho varnish to produce a printing ink, the latter product gives a print which possesses a bright, clean, bronzy tone. In other words, this new product possesses the strength of a toner and the printing quality of a lake.

*Example II.*—A mixture of 76 parts of metanitro-para-toluidine and 825 parts of water is pulped until a creamy paste is obtained. This paste is diazotized with 38 parts of sodium nitrite and 54 parts of muriatic acid (100%) in the usual manner and the diazo preparation is allowed to stir for 1½ hours.

In a separate container a solution of 79 parts of beta naphthol and 24 parts of caustic soda is prepared and made to a volume corresponding to approximately 2500 parts of solution at 38° C. To this is added a mixture of 4.7 parts of para soap in 60 parts of water, a solution of 85 parts of sodium acetate in 500 parts of water, a solution of 56 parts of sodium bicarbonate in 625 parts of water, and finally, a solution made by boiling 25 parts of naphthenic acid in a solution of 1 part of caustic soda and 375 parts of water until saponification is complete. The resulting solution is adjusted to 5600 parts of solution at 35° C. and the above diazo preparation is added in 1 hour, the azo coupling proceeds rapidly to completion. The dyestuff is stirred for 15 minutes, and then the slurry is struck with a solution of 13 parts of calcium chloride in 625 parts of water and the stirring continued for an additional 15 minutes. The product is then washed, filtered, and dried in the usual manner.

The yield is approximately 180 parts of pigment compared to 155 parts in a charge prepared without the naphthenic acid. The pigment contains about 14% of calcium naphthenate. The tinctorial properties are those of a lake of good strength.

In comparison to a product made with the above described intermediates following the procedure of French Patent 654,745, with reference to use of naphthenates the lake prepared by the above described process possesses a much greater strength and corresponding advantages in other tinctorial properties.

*Example III.*—A mixture of 100 parts of the sodium salt of the dyestuff 6-sulpho 4-chloro 3-toluene azo-beta-naphthol is pulped until a creamy paste is obtained with 1000 parts of water. The volume and temperature of the dyestuff slurry is then adjusted to 6000 parts of suspension at 25° C. In a separate container 18 parts of naphthenic acid are added to a solution of 1 part of caustic soda in 400 parts of water and boiled until the formation of the soluble naphthenic acid soap is complete. The naphthenic acid soap solution is then added to the boiling solution of 12 parts of calcium chloride in 1200 parts of water and boiled to complete the formation of the metallic soap. This calcium salt of naphthenic acid is then added to the above dyestuff slurry and stirred until a thorough mixture is obtained. A solution of 8 parts of boric acid in 160 parts of water is then added. After stirring a short time the dyestuff slurry is brough to 90° C. and the volume adjusted to 10,000 parts of suspension, it is then slowly added to a solution of 100 parts of barium chloride in 4000 parts of water at 90° C., and after being quickly brought to the boil, boiled 15 minutes to insure completion of its development. After which, it is washed, filtered and dried in the usual manner.

The yield is approximately 126 parts of dry product compared to 113 parts in a charge carried out in exactly the same way but without the naphthenic acid. The lake pigment contains about 10% of the calcium naphthenate, and possesses the usual tinctorial properties.

I claim:

1. In a process of preparing azo lakes and pigments the step of developing an aqueous suspension of an azo coloring compound and an insoluble naphthenate.

2. In a process of preparing azo lakes and pigments the step of developing by heating an aqueous alkaline suspension of an insoluble azo coloring compound and an insoluble naphthenate.

3. A lake or pigment comprising an azo coloring compound combined with a substratum comprising an insoluble naphthenate.

4. A lake or pigment comprising a water insoluble azo coloring compound combined with a substratum comprising a water insoluble naphthenate.

5. A lake or pigment comprising an alkaline earth metal salt of the azo compound obtained by coupling diazotized para-toluidine metasulfonic acid with beta oxynaphthoic acid combined with a substratum comprising an alkaline earth metal salt of naphthenic acid.

6. A lake or pigment comprising the azo compound obtained by coupling diazotized meta-nitro-para-toluidine with beta naphthol combined with a substratum comprising an alkaline earth metal salt of naphthenic acid.

7. A lake or pigment comprising an alkaline earth metal salt of the dyestuff obtained by coupling 4-chloro-3-toluidine-6-sulfonic acid with beta naphthol combined with a substratum comprising an alkaline earth metal salt of naphthenic acid.

ARCHIBALD M. ERSKINE.